Nov. 5, 1968

J. PASHAK ET AL 3,409,711

METHOD AND APPARATUS FOR THE PREPARATION OF FILAMENT REINFORCED
SYNTHETIC RESINOUS MATERIAL

Filed Nov. 1, 1965

INVENTORS.
Joseph Pashak
Walter A. Trumbull
BY

Robert B. Ingraham
AGENT

INVENTORS.
Joseph Pashak
Walter A. Trumbull
BY
AGENT

United States Patent Office 3,409,711
Patented Nov. 5, 1968

3,409,711
METHOD AND APPARATUS FOR THE PREPARATION OF FILAMENT REINFORCED SYNTHETIC RESINOUS MATERIAL
Joseph Pashak, Midland, and Walter A. Trumbull, Sanford, Mich., assignors to The Dow Chemical Company, Midland, Mich., a corporation of Delaware
Filed Nov. 1, 1965, Ser. No. 505,872
6 Claims. (Cl. 264—143)

ABSTRACT OF THE DISCLOSURE

Glass fibers are mixed with a plastic in a twin screw extruder by adding glass fibers through the volatile port. Strands are extruded and cut into particles. Smooth strands are obtained by extrusion through inwardly tapering die openings and maintaining the terminal portion of the screw within from 0.002 inch to 0.005 inch of the back of the die.

---

This invention relates to a method and apparatus for the preparation of filament reinforced synthetic resins and in particular relates to a method and apparatus for the extrusion of a strand of synthetic thermoplastic resin containing filamentary reinforcing agents.

It is highly desirable in many instances to incorporate filamentary reinforcing within a thermoplastic resinous material. It is also desirable to utilize such a filamentary reinforced material for moulding and extrusion. Considerable difficulty has been encountered in providing a suitable moulding granule containing a filamentary reinforcing material such as glass fibers. Beneficially such filamentary reinforced material may be chopped to a desired length and incorporated into a molten body of synthetic resinous thermoplastic material such as a styrene polymer. By heat plastifying the resinous material in an extruder such as a twin screw extruder having a devolatilization port, filamentary material may be added through the devolatilization port directly to the heat plastified synthetic resinous material while it is being malaxated by the extruder screws. This generally provides a highly desirable mixture of the reinforcing filaments and the thermoplastic resinous material. The reinforced resinous material is then extruded from a die opening to provide a strand of desired size which is subsequently cut into short lengths to provide moulding granules. Considerable difficulty has been encountered in such extrusion, particularly when quantities of reinforcing material are more than about 10 percent of the weight of the reinforced material. The resultant strand which is extruded is oftentimes "hairy" in appearance, that is, the reinforcing filaments protrude from the surface preventing ready flow of the granules into a heat fabricating machine. Such protruding filaments are a source of undesired dust as the fibers are broken from the granules during handling and shipping. The significant and serious difficulty with extrusion is plugging of the extruder due to the accumulation and separation of glass fibers in or about the discharge end of the extruder. Frequently a non-uniform discharge is achieved as portions of the fibrous reinforcing material are concentrated and are suddenly discharged resulting in a non-uniform product. Oftentimes such fibers will accumulate in quantities sufficient to act as a filter and prevent the fibrous material from discharging from the extruder.

It would be beneficial if there were available a method and apparatus for the extrusion of filament reinforced thermoplastic material which would result in a uniform strand having a smooth surface.

It would also be advantageous if there were available an improved extrusion apparatus for the preparation of synthetic resins reinforced with glass fibers or filaments.

It would also be advantageous if there were a method and apparatus for the extrusion of fiber reinforced synthetic resinous material which would minimize or eliminate the separation of the fibers within the extruder.

These benefits and other advantages in accordance with the present invention are achieved in a method for the preparation of a fiber reinforced synthetic resinous body comprising heat plastifying a synthetic thermoplastic resinous material, adding to the heat plastified synthetic thermoplastic material a chopped filamentary reinforcing agent, admixing the filamentary reinforcing agent with the heat plastified resinous material by means of a twin screw extruder, discharging the filamentary reinforcing containing material from the extruder in the form of a strand, the improvement which comprises shearing the heat plastified synthetic resinous material, containing the filamentary reinforcing agent at the terminal portion of the screw against a configuration defining a plurality of extrusion orifices, each of the extrusion orifices decreasing in diameter in a direction away from the screw.

Also contemplated within the scope of the present invention is an apparatus for the production of a filamentary reinforced synthetic resinous particle or granule which comprises in cooperative combination a heat plastifying twin screw extruder adapted to heat plastify and extrude synthetic resinous thermoplastic material. The extruder having a polymer feed opening and an extrusion die, a reinforcing material feed opening disposed between the polymer feed opening and the extrusion die and so constructed and arranged so as to permit the addition of a filamentary material thereto, the extruder having first and second screws or worms the first screw having a first end adjacent the polymer feed port and a second end adjacent the die, the second end of the extruder screw terminating in an end or terminal portion which on rotation describes an included angle of at least 90°, the die defining a plurality of extrusion orifices, the die having an inner surface and an outer surface, the inner surface of the die defining a surface adapted to mate with the second end of the first screw, a plurality of webs separating the extrusion orifice, the webs terminating on the inner face of the die in a land having a width of about 1/16 of an inch, the minimum dimension of the cross-sectional configuration of the extrusion orifice in a plane normal to the center line of the orifice, each extrusion orifice being in communication with an extrusion passageway, the extrusion passageway terminating on the inner face in a plurality of extrusion inlet openings, each of the passageways decreasing in diameter toward the extrusion orifice.

Further features and advantages of the present invention will become more apparent when taken in connection with the specification and drawing wherein:

FIGURE 1 schematically depicts a sectional view of an apparatus in accordance with the invention.

Figure 1:
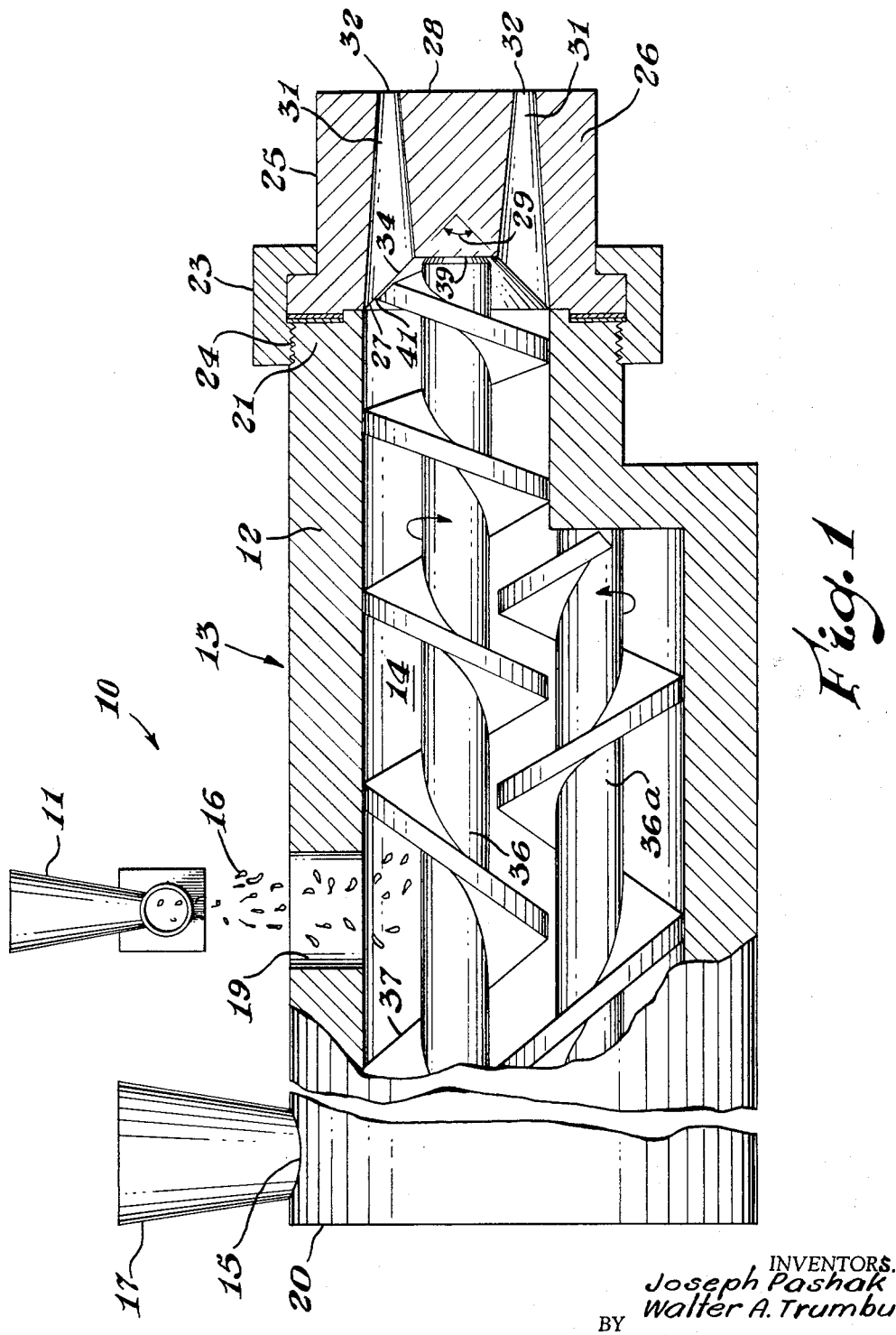

In FIGURE 1 there is schematically illustrated a partially cut-away representation of an apparatus generally designated by the reference numeral 10. The apparatus 10 comprises in cooperative combination a filamentary reinforcing supply or dispersing means 11 dispersing a plurality of chopped filaments 16, a twin screw extruder 13 having a barrel 12 defining an inner bore 14; the barrel 12 defines a polymer inlet port 15 having in operative communication therewith a polymer supply means 17. The barrel 12 defines an opening or volatile port 19, and has a first end 20 and a second end 21; the volatile port 19 is disposed between the first end 20 and the second end 21. A retaining ring or lock nut 23 is threadably affixed to the second end 21 of the barrel 12 by means of the screw threads 24. An extruder die 25 is adjustably secured to the second end 21 of the barrel 12. The die 25 comprises a body portion 26 defining an inner face 27 and an outer face 28. The inner face 27 defines an included angle 29 which is at least 90°. The body 26 defines a plurality of extrusion passageways 31, each of the extrusion passageways terminates in an extrusion orifice 32 positioned in the outer face 28 of the die 25, the extrusion passageway 31 also terminates at inlet openings 34 disposed at the inner face 27, the passageway 31 is of a tapering configuration and has constantly decreasing diameter of the cross sectional configuration in a plane normal to the axis of the extrusion orifice 32 in a direction from the inner face 27 toward the outer face 25. A first screw 36 and a second screw 36a are disposed within the inner bore 14 of the extruder 13 and adapted to rotate and forward material within the bore 14 to the die 25. The screws 36 and 36a intermesh. The screw 36 defines a flight or land 37 and a terminal end portion 39, the terminal end portion 39 is disposed adjacent the face 27 of the die 25. The terminal end portion 39 of the screw 36 on revolving about its axis of rotation describes a surface substantially identical in shape to the surface of rotation generated by rotation of the die 25 about the axis of the screw. A running clearance 41 of from about 0.002 to 0.005 of an inch permits free rotation of the screw within the bore and adjacent the inner surface 27 of the die 25.

Figure 2:
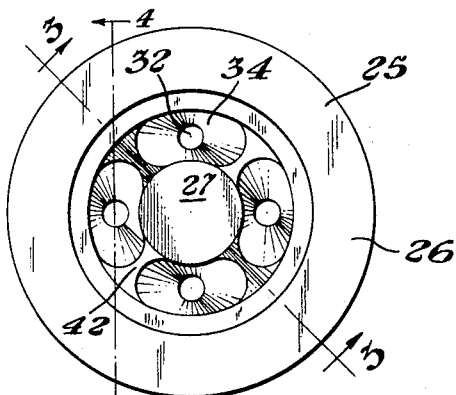
FIGURE 2 depicts a view of a die of the apparatus of FIGURE 1.

In FIGURE 2 there is depicted a view of the die 25 taken from the inner surface 27 and looking into the inlet openings 34 of the passageway 31, a land 42 is disposed between adjacent inlet openings 34, the land has a width of about 1/16 of an inch about the minimum dimension of the cross sectional configuration of the passageway or orifice 31 normal to the center line thereof.

Figure 3:
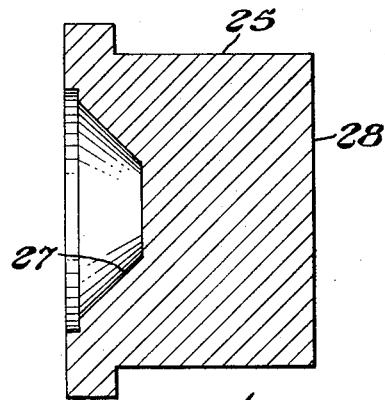
FIGURE 3 is a sectional view of the die of FIGURE 2 taken along the line 3—3.

FIGURE 3 is a sectional view of the die of FIGURE 2 taken along the line 3—3 depicting the configuration of the surface 27.

Figure 4:
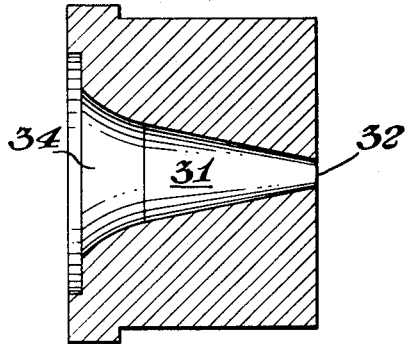
FIGURE 4 is a sectional view of the die of FIGURE 2 taken along the line 4—4.

FIGURE 4 is a sectional view of the die of FIGURE 2 taken along the line 4—4 showing a cross sectional view of the passage 31 and the inlet opening 34 of the extrusion orifice 32.

Figure 5:
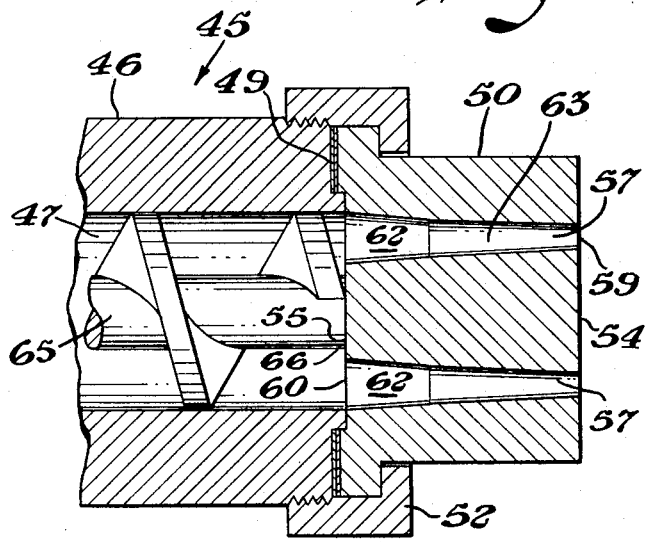
FIGURE 5 is a schematic representation of an alternate embodiment of the invention.

FIGURE 5 illustrates a schematic sectional view of an alternate embodiment of the invention generally designated by the reference numeral 45. The apparatus 45 comprises an extruder barrel 46 having defined therein a cylindrical bore 47, the barrel 46 has a terminal end 49, an extruder die 50 is adjustably affixed to the end 49 of the barrel 46 by means of a retaining ring or lock nut 52. The extruder die 50 has an extruder die face 54 and an internal face 55 both the external die face 54 and an internal face 55 both the external face and the internal face are of generally planar configuration. A plurality of extrusion passageways 57 are defined within the die 50 and provide communication between the face 54 and 55. The passageways 57 terminate in the extrusion orifices 59 of the face 54 and an inlet opening 60 from the face 55. Each of the passageways 57 is of a generally tapering configuration, the passageway 57 has a first tapering portion 62 and a second tapering portion 63. The portion 62 is disposed generally adjacent the inlet opening 60 while the portion 63 is disposed generally adjacent the opening 59. Where the portions 62 and 63 join, the dimensions of each section are substantially equal. Disposed within the bore 47 of the barrel 46 is a first extrusion screw 65 having a terminal end 66. Rotation of the end of the screw 65 generates a surface which is a plane and has a diameter substantially equal to the bore 47 of the barrel 46. A second inter-meshing screw is not shown. A running clearance of about 0.002 to 0.005 of an inch exists between the end 66 of the screw 65 and the internal face 55 of the die 50.

Figure 6:
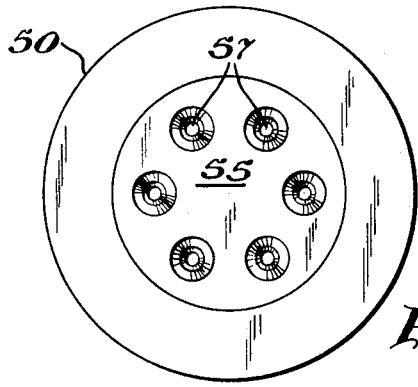
FIGURE 6 is a view of the die of FIGURE 5 from the discharge end.

FIGURE 6 depicts an end view of the die 50 of FIGURE 5 as viewed from the face 55 showing the location of the passageway 57.

In operation of the apparatus in accordance with the invention as depicted in any of the figures, synthetic resinous thermoplastic material is provided to the polymer inlet port of the extruder either in a granular form or in a heat plastified stream or mass, the screws of the extruder are rotated in an appropriate direction to forward the polymer toward the extrusion orifice. Beneficially in many cases where granular polymer is fed to the extruder, a screw of varying root diameter is employed to provide a restriction in the barrel between the volatile port such as the port 19 and the polymer inlet port 15.

It is essential to employ a twin screw extruder and add chopped filamentary reinforcing material such as glass to the nip between the counter rotating screws of the extruder. The temperature of the barrel of the extruder screw is maintained at a suitable heat plastifying temperature for the thermoplastic resinous material being extruded. The heat plastified material containing the filamentary reinforcing material is then forwarded to the die where it is extruded at a temperature determined by the characteristics of the polymeric material. It is essential and critical to the operation of the present invention that the lands between the passageways in the die have a minimum distance of about 1/16 of an inch to about the minimum dimension of the cross-sectional configuration of the extrusion orifice and preferably having a dimension of from about 1/8 to about 1/2 of an inch. It is also critical that the terminal portions of the screw have a very close running clearance, that is in the range of from about 0.002 to about 0.005 of an inch. If such a running clearance is not maintained, that is if the clearance is greater than about 0.005 inch, a nonuniform product is obtained, and generally if the clearance is set closer than about 0.002 of an inch, the die and screw wear to provide such a clearance. Usually the running clearance is adjusted during operation to the desired clearance because of thermal expansion of the extruder components. It is also critical that the passageway within the die be of a tapering configuration and taper toward the outward end at a minimum angle of at least 0.5° (from centerline of passage ) and no surface in the passageway should have an angular deviation from the center line of the extrusion orifice greater than about 45°. If the angle of the wall of the passage is less than about 1/2 of 1° a "hairy" product is obtained, that is the filamentary reinforcing materials tend to project from the extruded strand and give an undesirable product. If the surface has an angle greater than about 45° there is a tendency for the filamentary reinforcing material to collect thereon and periodically discharge to result in nonuniform distribution of the filamentary reinforcing material in the extruded strand. It is essential that no area within the die that is lying between the end of the extruder and the die orifice provide a region which would permit the build up of the filamentary reinforcing material during the extrusion. The strands, on emerging from the die, beneficially are cooled below the thermoplastic temperature of the material employed and severed into appropriately sized granules. If desired, the strands may be severed while having a temperature at or about the thermoplastic temperature of the polymer if the granular shape is acceptable for the desired end use.

By way of further illustration a plurality of extrusion runs are made utilizing a twin screw extruder wherein the discharge screw and die have a configuration substantially as illustrated in FIGURE 1. The extruder was a 2½" welding engineers twin screw extruder having a volatile port, the filamentary reinforced material (one-half inch long glass fibers) are added to the volatile port in such a manner that it is drawn into head plastified resinous material by the counter-rotating twin screws admixed therewith. The clearance between the screw and the die is maintained between 0.002 and 0.005 of an inch. The results are set forth in the following table.

| Run No. | Parts by weight polymer | Weight percent glass fiber | Extrusion temperature, °C. |
|---|---|---|---|
| (1) | 100 (copolymer of 28% acrylonitrile and 72% styrene). | 28 | 258 |
| (2) | 70 polypropylene | 20 | 238 |
| (3) | 72 polyvinyl chloride | 18 | 217 |
| (4) | 120 polystyrene | 33 | 242 |

In each case a relatively smooth surface strand is obtained which is readily severed into granules of the desired size. By way of contrast the die was spapced 0.010 of an inch from the terminal end of the screw, poor distribution of the glass was obtained and the land width between the passageways and the die was reduced below 1/16 of an inch. Poor distribution of glass was obtained. When a die utilizing a cylindrical passageway is employed a hairy strand results. In the manner similar to the foregoing illustration other synthetic resinous thermoplastic materials are successfully extruded into strands having a generally smooth surface when employing a die and screw in accordance with the present invention.

As is apparent from the foregoing specification, the present invention is susceptible of being embodied with various alterations and modifications which may differ particularly from those that have been described in the preceding specification and description. For this reason it is to be fully understood that all of the foregoing is intended to be merely illustrative and is not to be construed or interpreted as being restrictive or otherwise limiting of the present invention excepting as it is set forth and defined in the hereto appended claims.

What is claimed is:

1. In a method for the preparation of a filamentary reinforced synthetic resinous body comprising heat plastifying a synthetic resinous material, adding to the heat plastified synthetic resinous material a chopped filamentary reinforcing agent, filamentary reinforcing agent being present in proportions of from about 10 to about 45 weight percent of the synthetic resinous material, admixing the filamentary reinforcing agent with the heat plastified resinous material by means of a twin screw extruder, the improvement which comprises:

shearing the heat plastified material containing reinforcing agent at the terminal portion of the screw against a die wherein the running clearance between the terminal portion of the screw and the die is from about 0.002 inch to about 0.005 inch, the die defining a plurality of extrusion passages, each of the extrusion passages decreasing in diameter in a direction away from the screw, each extrusion passage having an extrusion passage configuration having an angle of 0.5° to 45° from the center line of the passage, the die defining a land between each extrusion passage, the land having a width of from about 1/16 inch to about the minimum dimension of the cross-sectional configuration of the extrusion passage at the terminal end of the screw.

2. The method of claim 1 wherein the material is sheared against a configuration having a width of from about 1/8 to about 1/4 of an inch.

3. The method of claim 1 wherein the extruded strands are subsequently severed into a molding granule.

4. The method of claim 1 wherein the synthetic resinous thermoplastic material is a styrene polymer.

5. An apparatus for the production of a filamentary synthetic reinforcing particle which comprises in cooperative combination a heat plastifying twin screw extruder adapted to heat plastify and extrude synthetic resinous thermoplastic material, the extruder having a polymer feed opening and an extrusion die, a reinforcing material feed opening disposed between the polymer feed opening and the extrusion die, and so constructed and arranged so as to permit the addition of the filamentary material thereto, the extruder screw having a first end adjacent the polymer feed port, the second end adjacent the die, the second end of the extruder screw terminating in an end which on rotation describes an included angle of at least 90°, the die defining a plurality of extrusion passages, the passages defining an angle of from about 0.5° to 45° from the center line of the passage, the die having an inner surface and an outer surface, the inner surface of the die defining a surface adapted to mate with the second end of the rotating screw and maintain a working clearance of from about 0.002 inch to about 0.005 inch between the second end of the screw and the surface adapted to mate with the second end of the screw, a plurality of webs or lands separating the extrusion passages, webs terminating on the inner face of the die in a land having a width of about 1/16 of an inch to about the minimum dimension of the axial cross-sectional configuration of the extrusion passage, each extrusion passage being in communication with an extrusion orifice, the extrusion passageway terminating on the inner face in a plurality of extrusion inlet openings, each of the passageways decreasing in diameter toward the extrusion orifice.

6. The apparatus of claim 5 wherein the second end of the screw describes an angle of 180° on rotation thereof.

References Cited

UNITED STATES PATENTS

| 3,078,511 | 2/1963 | Street | 18—12 X |
| 3,304,282 | 2/1967 | Cadus et al. | 264—349 X |
| 3,304,578 | 2/1967 | Clute | 18—12 |

ROBERT F. WHITE, *Primary Examiner.*

J. H. SILBAUGH, *Assistant Examiner.*